Oct. 7, 1952     L. E. H. GUSTAVSSON     2,612,699
DEVICE FOR MEASURING LENGTHS
Filed Nov. 28, 1949     4 Sheets-Sheet 1
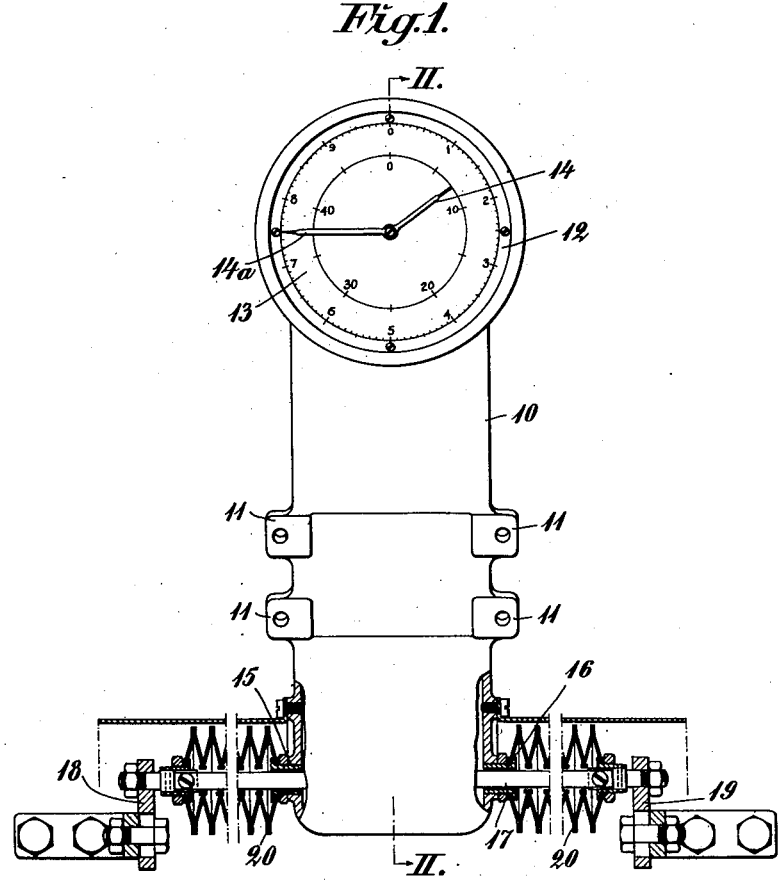
Inventor:
Lars Erik Herbert Gustavsson,
By: Pierce, Scheffler & Parker,
Attorneys.

Oct. 7, 1952     L. E. H. GUSTAVSSON     2,612,699
DEVICE FOR MEASURING LENGTHS
Filed Nov. 28, 1949     4 Sheets-Sheet 2
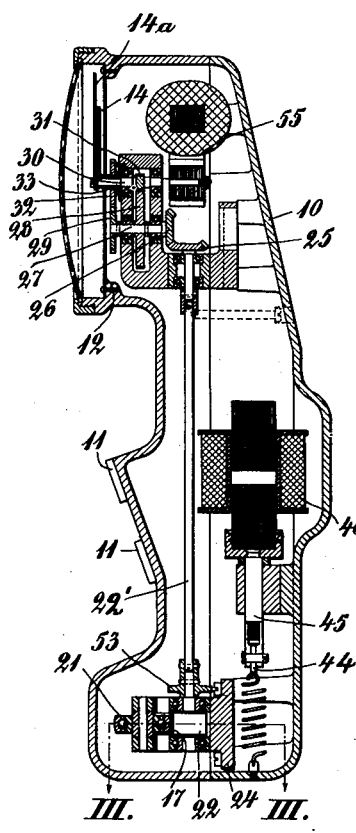
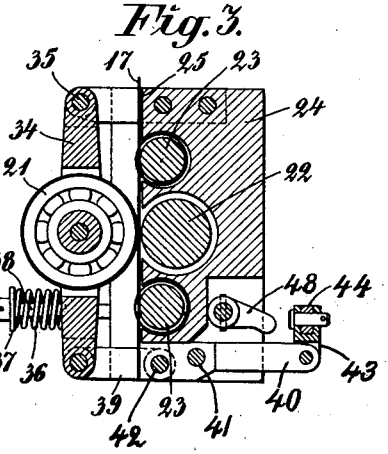

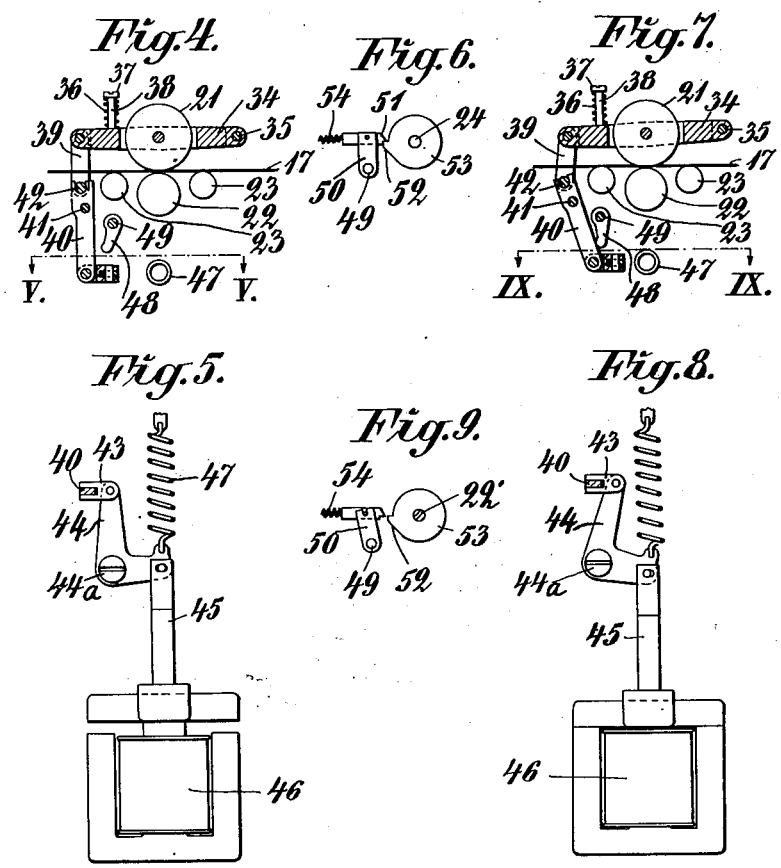

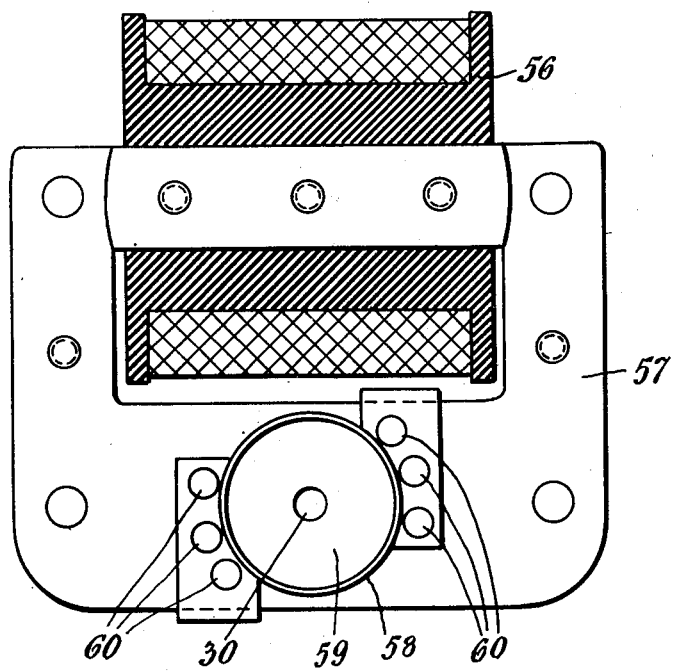
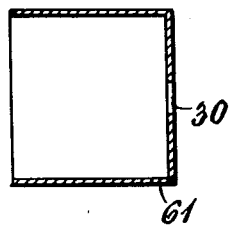

Patented Oct. 7, 1952

2,612,699

UNITED STATES PATENT OFFICE 2,612,699

DEVICE FOR MEASURING LENGTHS

Lars Erik Herbert Gustavsson, Karlskoga, Sweden

Application November 28, 1949, Serial No. 129,761
In Sweden May 19, 1948

5 Claims. (Cl. 33—141)

The present invention relates to a device for measuring lengths and more specifically to a device for measuring the advancement of the tool in such machine tools as slide lathes and cylinder grinding and other machine tools.

The primary object of the invention is to make possible a rapid and exact measuring of such lengths.

Another object is to provide a device which is automatically reset to zero when the device is released.

A still further object is to provide a device in which all play in the gears and other connections between the means for measuring the lengths under consideration and the means for indicating such lengths is compensated for by means of a constant counteracting torque applied to the indicator shaft.

Another object is to provide an electrical motor for generating the torque necessary.

Other objects of the invention and advantages to be derived from its use become apparent from the following description taken in connection with the annexed drawings in which:

Fig. 1 is a partial sectional front view of a device according to the invention.

Fig. 2 is a section on the line II—II in Fig. 1.

Fig. 3 is a section on the line III—III in Fig. 2.

Figs. 4 to 9 show in section and diagrammatically the means for engaging and disengaging the measuring device proper.

Fig. 10 is a section through an electrical motor especially adapted for use in the device according to the invention and Fig. 11 is an axial section through a rotor screen.

In the drawings 10 designates a casing for the device according to the invention. Said casing is provided with pierced lugs 11 for mounting the device on the part of the machine tool the movements of which are to be measured. The upper part of the casing is provided with an opening 12 for a dial 13 preferably provided with two concentric graduations the outer of which shows for instance one hundredths of a millimeter between two consecutive scale lines and the inner graduation being divided into millimeters. Centrally of the dial there are mounted two pointers 14, 14a one for each graduation.

In the lower part of the casing 10 there are two laterally opposite openings 15, 16 for a metal band 17 passing through the casing across the same. At the opposite ends the band 17 is secured to the frame of the machine or other stationary part of the same by means of brackets 18, 19 constructed to provide a constant tension in the band and also to vary said tension as desired. The band is protected against dirt and dust by means of two bellows 20 between each bracket and the opposite sides of the casing 10.

Within the casing the band 17 runs between an adjustable pressure roller 21 and an assembly comprising a drive a roller 22 and two flanged guide rollers 23. The roller 21 and 23 are mounted on ball bearings and are idlers whereas the roller 22 is secured on a shaft 22' transmitting the rotation of the roller to the pointers 14, 14a. The rollers 22, 23 are mounted in recesses in a casing structure 24 with a substantially plane surface 25 opposite and in spaced parallel relation to the band 17. The surface 25 is always kept free of the band by means of the guide rollers 23 which also are mounted so that the band 17 normally runs free of the roller 22 the distance between the band and the roller preferably being of the order 0.05 mm. When a length is to be measured the band is pressed against the roller 22 by means of the roller 21. The preferred construction for advancing the roller 21 against the roller 22 will be described in detail below.

As mentioned above the shaft 22' is fixedly secured to the roller 22 and transmits the rotation of said roller to the pointers 14, 14a. For this purpose the shaft at its upper end is secured to a bevel gear 25 in mesh with a second bevel gear 26 fixedly secured to a shaft 27 with two fixedly secured gears 28, 29. The gear 28 is in mesh with a gear 31 secured to the shaft 30 of the pointer 14 while the gear 29 is in mesh with a gear 32 fixedly secured to a tubular shaft 33 carrying the second pointer 14a. The end of the shaft 30 opposite the pointer 14 is connected to a device for generating a constant unidirectional torque. This device may be of the type of a coil spring sliding on the shaft with constant friction but according to a preferred embodiment an electrical motor of a special design is used. This motor is described with reference with Figs. 10 and 11.

Referring to Fig. 3 the device for advancing the roller 21 against the driven roller 22 will now be described in detail. The roller 21 is rotatably mounted in a bridge 34 pivotably mounted at 35. The bridge 34 is normally urged against the casing 24 by means of a spring 36 seated against a washer 37 mounted on the bolt 38 fixedly secured in the casing 24 and against the outer surface of the bridge 34. The outer end of the bridge is pivotably connected to two links 39, one on either side edge of the band 17, forming a toggle with lever 40 pivoting on pin 41. The lever 40 cooperates with the links 39 by means of its forked end and a pin 42 secured in the links 39. The opposite end of lever 40 is pivotally connected to a bell crank 44 by means of a link 43. The bell crank 44 is pivotally mounted on a bolt 44a and the other end of it is pivotally connected to a core 45 of an electromagnetic coil 46. The core 45 is attracted by the coil 46 against the action of a spring 47. In Figs. 5 and 8 the coil, core, spring, and bell crank are shown in a diagrammatic arrangement inverted with respect to Fig. 2.

The device described operates as follows:

The coil 46 when energized attracts the core 45 against the action of spring 47 and this movement causes the lever 40 to pivot on its pin 41 so that the toggle will collapse and the bridge 34 with the roller 21 will be advanced under the action of spring 36 so that the band 17 is pressed against the roller 22. The parts described will now have the positions shown in Fig. 7.

During the last part of its pivoting movement the lever 40 cooperates with a lever 48 fixedly secured to a shaft 49 and moves said lever counter clockwise as shown in Fig. 7. Said shaft is at its other end fixedly connected to a second lever 50 (Fig. 9) pivotally cooperating with a pawl 57 acting on a locking projection 52 formed on the periphery of a circular disc 53 (Figs. 3 and 9) secured to the shaft 22' between the roller 22 and the bevelled gear 25. Thus when the lever 48 is swung counter clockwise the pawl 51 is moved to the left (Fig. 9) and the disc 53 with the shaft is free to rotate.

The device is now ready for operation and a displacement of the device along the band 17 will result in a rotation of the roller against the band and this rotation is transmitted to the pointers 14, 14a.

When the coil 46 is disenergized the core 45 is attracted by the spring 47 and the toggle is stretched and moves the bridge 34 away from the band 17. The lever 48 is swung clockwise under the action of a compression spring 54 and the pawl 51 is brought into the path of the projection 52 so that the shaft 22' and the disc 53 are free to rotate under the action of the unidirectional torque mentioned until the projection 52 abuts the pawl 51. The apparatus may now be moved along the band without registering the movement.

As shown in Fig. 2 the free end of shaft 30 is secured to the rotor of an electric motor generally designated 55. The object of the motor is to generate a constant torque for compensating for all play in the gearing. This torque must of course be substantially less than the torque transmitted from the roller 22 when rolling against the band 17. A further object of the motor is to turn the pointers back to initial position until the projection 52 of the disc 53 abuts the pawl 51. When this happens the pointers are in the zero position and the apparatus is ready for measuring a new length.

For the purposes mentioned above it is of course possible to use different means known per se but I prefer to use the motor shown in Fig. 10. This motor is of the shaded-pole type motor and substantially comprises a stator coil 56, a rectangular yoke 57 with a cylindrical boring 58 for the rotor 59. Peripherally of the boring there are arranged short-circuiting coils 60. The rotor 59 is modified in relation to the rotor of the known motors of this type in that there are no coils but only a cylindrical copper socket 61 (Fig. 11).

Due to the fact that the friction in the transmission from the roller 22 to the pointers 14, 14a is reduced to a minimum by the frequent use of roller bearings in all places where such bearings may be used with advantage the torque required from the motor for obtaining the objects mentioned above is extremely small and in practice a motor giving a moment of 200 g. mm. has proved to give satisfying compensation for the play in the gears. The torque from the motor may of course not be so great that said torque causes any slip between the roller 22 and the band 17.

The invention is not restricted to the preferred embodiment described and shown as it is possible to substitute certain parts for technical equivalents. Thus the electro-magnet for engaging and disengaging the roller 22 may be replaced by hydraulic or mechanical means the design of which is obvious for those skilled in the art but I prefer to use electrically operated means for this purpose as well as for generating the torque for compensating for the play in the gears. By doing so, it is possible to obtain simpler construction when using electrically operated means when the apparatus is movable with the slide in a turret and the band is stationary, as the control for controlling the measuring apparatus preferably is mounted on the slide so that the operator will not have to move from his position in the vicinity of the working tool. If the apparatus is stationary and the band movable mechanical or hydraulic means may of course be used as there will be no relative movement between the apparatus and the control.

I claim:

1. In apparatus for measuring the displacement of two relatively movable members, an elongated element and bracket means securing the ends thereof to one of said members, measuring means carried by the other member and including a drive roller adapted to be rotated by said elongated element, idler guide rollers at the same side of said elongated element as said drive roller and at opposite sides of said drive roller, said guide rollers being so positioned that said elongated member when coinciding with a common tangent to the guide rollers is spaced radially from said drive roller, and coupling means including a spring pressed roller for deflecting said elongated element out of the plane of said common tangent and into contact with said drive roller.

2. The invention as recited in claim 1, wherein said coupling means comprises toggle mechanism supporting said spring-pressed roller and movable between alternative end positions in which said spring-pressed roller forces said elongated member against or alternatively allows it to move away from said drive roller.

3. The invention as recited in claim 2 wherein said toggle mechanism is spring-urged into one end position, in combination with manually controlled means for moving said toggle mechanism into its alternative end position.

4. The invention as recited in claim 1, wherein said coupling means comprises toggle mechanism supporting said spring-pressed roller and movable between alternative end positions in which said spring-pressed roller forces said elongated member against or alternatively allows it to move away from said drive roller, in combination with means yieldingly urging said measuring means and the drive roller thereof towards end positions corresponding to zero displacement, thereby to eliminate lost motion and to return the measuring means to said zero end position upon movement of said toggle mechanism to relieve said elongated member from contact with said drive roller, latch means for latching said measuring means in said zero end position, and means operable on movement of said toggle mechanism into its alternative position to release said latch mechanism.

5. The invention as recited in claim 1, in combination with a casing housing said measuring means and said coupling means, said casing having alined openings through which said elongated member passes, and bellows forming protective enclosures for the ends of said elongated member at opposite sides of said casing, the ends of the bellows being secured over the respective casing openings and the ends of said elongated member.

LARS ERIK HERBERT GUSTAVSSON.

REFERENCES CITED

The following references are of record in the file of this patent:

UNITED STATES PATENTS

| Number | Name | Date |
| --- | --- | --- |
| 1,015,305 | Fentzloff | Jan. 23, 1912 |
| 2,196,231 | Ridgway | Apr. 9, 1940 |
| 2,321,443 | Windfeldt | June 8, 1943 |

FOREIGN PATENTS

| Number | Country | Date |
| --- | --- | --- |
| 1,760 | France | Nov. 12, 1845 |
| 339,643 | Germany | July 29, 1921 |
| 557,069 | Great Britain | Nov. 3, 1943 |